United States Patent
Bohannon

(10) Patent No.: US 8,637,586 B2
(45) Date of Patent: Jan. 28, 2014

(54) OPAQUE WATERBORNE UV SCRATCH RESISTANT COATINGS

(71) Applicant: Valspar Sourcing, Inc., Minneapolis, MN (US)

(72) Inventor: James Madison Bohannon, High Point, NC (US)

(73) Assignee: Valspar Sourcing, Inc., Minneapolis, MN (US)

(*) Notice: Subject to any disclaimer, the term of this patent is extended or adjusted under 35 U.S.C. 154(b) by 0 days.

(21) Appl. No.: 13/724,484

(22) Filed: Dec. 21, 2012

(65) Prior Publication Data

US 2013/0116359 A1   May 9, 2013

Related U.S. Application Data

(63) Continuation of application No. 12/853,744, filed on Aug. 10, 2010, now Pat. No. 8,389,591.

(51) Int. Cl.
| | | |
|---|---|---|
| *A01G 31/00* | (2006.01) | |
| *A61L 2/08* | (2006.01) | |
| *A61L 24/00* | (2006.01) | |
| *C08F 2/46* | (2006.01) | |
| *C08G 61/04* | (2006.01) | |

(52) U.S. Cl.
USPC .......... 522/72; 522/71; 522/189; 522/184; 522/1; 520/1

(58) Field of Classification Search
USPC .......... 522/72, 71, 189, 1, 184; 520/1
See application file for complete search history.

(56) References Cited

U.S. PATENT DOCUMENTS

| | | | |
|---|---|---|---|
| 3,373,071 A | 3/1968 | Fuerst | |
| 6,048,471 A | 4/2000 | Henry | |
| 6,239,189 B1 | 5/2001 | Narayan et al. | |
| 6,262,149 B1 * | 7/2001 | Clark et al. | 523/501 |
| 6,641,629 B2 | 11/2003 | Safta et al. | |
| 6,727,310 B2 | 4/2004 | Mizutani et al. | |
| 8,389,591 B2 * | 3/2013 | Bohannon | 522/33 |
| 2004/0059045 A1 * | 3/2004 | Kitchin et al. | 524/507 |
| 2005/0170100 A1 | 8/2005 | Weine Ramsey | |
| 2005/0256262 A1 | 11/2005 | Hill et al. | |
| 2006/0280701 A1 | 12/2006 | Lynch | |
| 2007/0093576 A1 * | 4/2007 | Albrecht et al. | 524/261 |
| 2007/0154632 A1 | 7/2007 | Schaefer et al. | |
| 2012/0041092 A1 | 2/2012 | Bohannon | |

FOREIGN PATENT DOCUMENTS

CN    101805541 A    8/2010

OTHER PUBLICATIONS

Notification Concerning Transmittal of International Preliminary Report on Patentability (Chapter I of the Patent Cooperative Treaty) for corresponding application No. PCT/US2011/047115, mailed Feb. 21, 2013, 7 pp.
Witzeman et al., "Comparison of Methods for Preparation of Acetoacetylated Coating Resins," Journal of Coatings Technology, vol. 62, Oct. 1, 1990, pp. 101-112.
Koleske et al., "2003 Additives Guide," Paint and Coatings Industry, Apr. 2003, pp. 12-86.
International Search Report for corresponding application No. PCT/US2011/047115 mailed Nov. 7, 2011, 4 pp.
Written Opinion of International Searching Authority for corresponding application No. PCT/US2011/047115 emailed Jan. 25, 2013, 6 pp.

* cited by examiner

*Primary Examiner* — Ling Choi
*Assistant Examiner* — Jessica E Whiteley
(74) *Attorney, Agent, or Firm* — Shumaker & Sieffert, P.A.

(57) ABSTRACT

A coating composition includes a UV curable film forming resin; a thixotropic and/or pseudoplastic anti-settling agent selected from at least one of an amine salt of a synthetic wax, a microcrystalline cellulose compound (MCC), a urea urethane, or a urethane enzymatically modified starch; a mar/scratch resistant additive selected from at least one of a mineral abrasive, glass particles, and ceramic particles; and water.

13 Claims, No Drawings

OPAQUE WATERBORNE UV SCRATCH RESISTANT COATINGS

This application is a continuation of U.S. patent application Ser. No. 12/853,744, filed Aug. 10, 2010, the entire content of which is incorporated by reference herein.

BACKGROUND

Coating compositions (e.g. paints) can be formulated to provide, when cured, an opaque mar and/or scratch resistant coating. To provide an opaque coating with mar and/or scratch resistance, the coating composition is typically formulated with pigment particles, as well as anti-scratch agents such as, for example, metal oxide or ground glass particles. When the coating composition is stored in a container, over time the heavy and compact particles separate from the other components of the coating composition and settle on the bottom of the container to form a dense, hard cake layer. Before the coating composition can be applied to a surface, particularly if spray application is desired, the particles in the cake layer must be broken up, dispersed and re-suspended in the coating composition to form a substantially homogeneous solution. This re-suspension step requires extensive mechanical agitation and/or stirring, and can be particularly difficult if the coating composition is to be applied by spraying, or if a uniform, defect-free coating is desired.

The coating composition can be formulated with anti-settling agents to prevent or substantially reduce the settling of the scratch agent and pigment particles. However, incorporation of these anti-settling agents can cause an undesirable change in the viscosity of the coating composition, which can make application of the coating composition difficult.

SUMMARY

In one embodiment, the present disclosure relates to a coating composition including a UV curable film forming resin; about 0.5% by weight to about 5.0% by weight of a thixotropic/and or pseudoplastic anti-settling agent selected from at least one of an amine salt of a synthetic wax and a microcrystalline cellulose compound (MCC); about 5 wt % to about 80 wt % of a mar/scratch resistant additive selected from at least one of a mineral abrasive, glass particles, and ceramic particles; and water.

In another embodiment, the present disclosure relates to a coating composition including a UV curable film forming resin, wherein the resin is selected from at least one of polyurethanes and acrylics; an ethylenically unsaturated compound with multiple (meth)acryl functional groups; about 0.5% by weight to about 5.0% by weight of a thixotropic and/or pseudoplastic anti-settling agent selected from at least one of an amine salt of a synthetic wax and a microcrystalline cellulose compound (MCC); about 5 wt % to about 80 wt % of a mar/scratch resistant additive selected from at least one of a mineral abrasive and glass particles; and water.

In some embodiments, the coating compositions of the present disclosure can have a combination of excellent scratch/mar resistance and improved storage stability.

The details of one or more embodiments of the invention are set forth in the description below. Other features, objects, and advantages of the invention will be apparent from the description, and from the claims.

DETAILED DESCRIPTION

The present disclosure is directed to an aqueous coating composition (e.g. paint) that is opaque, ultraviolet (UV) curable, mar and/or scratch resistant, and which has excellent storage stability. In one embodiment, the coating composition includes a UV curable film-forming resin component, a mar or scratch resistant additive, water, and a thixotropic and/or pseudoplastic anti-settling agent such as at least one of: (1) an amine salt of a synthetic wax, (2) a microcrystalline cellulose compound (MCC), or (3) a urea urethane compound. The coating composition can be applied to a substrate by a wide variety of methods such as, for example, spraying, and cured with UV radiation to form a highly mar and scratch resistant coating. The cured coating has excellent leveling and reduced surface defects such as orange peel. The coating composition also has excellent storage stability, and in some embodiments is storage stable for a period of 6 months or longer.

The coating compositions have a relatively low volatile organic content without sacrificing the balance of properties desired for an applied (dry) coating. Preferably, the coating compositions include no more than 10 weight percent (wt %) volatile organic compounds (VOC), more preferably no more than about 7 wt %, and even more preferably no more than about 4 wt %, based on the total weight of the composition. The term "volatile organic compound" is defined in U.S. Pat. No. 6,048,471 (Henry) and in the U.S. Federal Register: Jun. 16, 1995, volume 60, number 111.

The coating compositions are waterborne, and include about 40 wt % to about 90 wt % water, more preferably about 40 wt % to about 70 wt % water, based on the total weight of the composition.

The film forming component of the coating composition can include any UV curable water-dispersible or latex polymer. A "latex" polymer means a dispersion of polymer particles in water; a latex polymer typically requires a secondary dispersing agent (e.g., a surfactant) for creating a dispersion or emulsion of polymer particles in water. A "water-dispersible" polymer means the polymer is itself capable of being dispersed into water (i.e., without requiring the use of a separate surfactant) or water can be added to the polymer to form a stable aqueous dispersion (i.e., the dispersion should have at least one month shelf stability at normal storage temperatures). Such water-dispersible polymers can include nonionic or anionic functionality on the polymer, which assist in rendering them water-dispersible. For such polymers, external acids or bases are typically required for anionic stabilization.

Suitable UV curable polymers include, but are not limited to, polyurethanes, epoxies, polyamides, chlorinated polyolefins, acrylics, oil-modified polymers, polyesters, and mixtures or copolymers thereof. The UV curable polymers in the coating composition can include a wide variety of functional groups to modify their properties for a particular application, including, for example, acetoacetyl, (meth)acryl (wherein "(meth)acryl" refers to any of methacryl, methacrylate, acryl or acrylate), vinyl, vinyl ether, (meth)allyl ether (wherein (meth)allyl ether refers to an allyl ether and a methallyl ether), or mixtures thereof.

In one embodiment, the UV curable polymers in the coating composition include acetoacetyl functional groups:

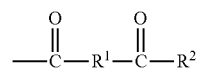

wherein $R^1$ is a C1 to C22 alkylene group and $R^2$ is a C1 to C22 alkyl group. Preferably, $R^1$ is a C1 to C4 alkylene group and $R^2$ is a C1 to C4 alkyl group, and more preferably, $R^1$ is methylene (—$CH_2$—) and $R^2$ is methyl (—$CH_3$).

Acetoacetyl functionality may be incorporated into the UV curable polymer through the use of: acetoacetoxyethyl acrylate, acetoacetoxypropyl methacrylate, allyl acetoacetate, acetoacetoxybutyl methacrylate, 2,3-di(acetoacetoxy)propyl methacrylate, 2-(acetoacetoxy)ethyl methacrylate, t-butyl acetoacetate, diketene, and the like, or combinations thereof. In general, any polymerizable hydroxy functional or other active hydrogen containing monomer can be converted to the corresponding acetoacetyl functional monomer by reaction with diketene or other suitable acetoacetylating agent (see, e.g., Comparison of Methods for the Preparation of Acetoacetylated Coating Resins, Witzeman, J. S.; Dell Nottingham, W.; Del Rector, F. J. Coatings Technology; Vol. 62, 1990, 101 (and references contained therein)). In preferred coating compositions, the acetoacetyl functional group is incorporated into the polymer via 2-(acetoacetoxy)ethyl methacrylate, t-butyl acetoacetate, diketene, or combinations thereof.

If the UV polymer used in the coating composition is a latex polymer, the latex polymer particles preferably have an average particle size of less than 75 nanometers (nm), more preferably less than about 50 nm.

For example, an acetoacetyl functional latex polymer can be prepared through chain-growth polymerization, using, for example, 2-(acetoacetoxy)ethylmethacrylate (AAEM) and one or more ethylenically unsaturated monomers. Examples of ethylenically unsaturated monomers include, but are not limited to, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidylether, acrylamide, methylacrylamide, styrene, α-methyl styrene, vinyl toluene, vinyl acetate, vinyl propionate, allyl methacrylate, and mixtures thereof.

Preferably, the ethylenically unsaturated monomers used to make the latex polymer include styrene. For example, in certain embodiments the latex polymers can include about 7.5 wt % to about 75 wt % styrene, and in other embodiments, about 20 wt % to about 50 wt % styrene, based on the total weight of the latex polymer.

The latex polymers are typically stabilized by one or more nonionic or anionic emulsifiers (i.e., surfactants), used either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)lauramide, N-lauryl-N-polyoxyethylene(3)amine, and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$-$C_{16}$) sulfonate, sulfates of hydroxyalkanols, tetrasodium N-(1,2-dicarboxyethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate. Various combinations of emulsifiers can be used, if desired.

The latex polymer may also be stabilized with an alkali-soluble polymer. Alkali-soluble polymers may be prepared by making a polymer with acrylic or methacrylic acid or other polymerizable acid monomer (usually greater than 10%) and solubilizing the polymer by addition of ammonia or other base. The alkali-soluble polymer may contain acetoacetyl functionality. Examples of suitable alkali-soluble support polymers are JONCRYL 675 and JONCRYL 678.

A water-soluble free radical initiator is typically used in the chain growth polymerization of a latex polymer. Suitable water-soluble free radical initiators include hydrogen peroxide, tert-butyl peroxide, alkali metal persulfates such as sodium, potassium and lithium persulfate, ammonium persulfate, and mixtures of such initiators with a reducing agent. Reducing agents include sulfites, such as alkali metal metabisulfite, hydrosulfite, and hyposulfite, sodium formaldehyde sulfoxylate, and reducing sugars such as ascorbic acid and isoascorbic acid. The amount of initiator is preferably from 0.01 wt % to 3 wt %, based on the total amount of monomer. In a redox system the amount of reducing agent is preferably from 0.01 wt % to 3 wt %, based on the total amount of monomer. The temperature may be in the range of 10° C. to 100° C.

In another embodiment, the polymers used in the coating composition are water dispersible. Preferred water dispersible polymers include alkyds, polyesters, and polyurethanes, which may be prepared by any method known in the art.

For example, a water-dispersible polyester can be prepared by reacting one or more polybasic acids with one or more polyols to give a polymer with excess hydroxyl functionality. The resulting polyester could be further reacted with either t-butyl acetoacetate, or diketene to incorporate acetoacetyl-functionality onto the polymer, and with a suitable anhydride such as trimellitic anhydride to render the polyester acid functional. The resulting acid functionality may then be neutralized with a neutralizing base to render the polyester water dispersible.

For example, a water-dispersible alkyd can be prepared by reacting one or more of the alcoholysis product of an oil and polyol, fatty acids, monoglycerides or diglycerides and one or more polybasic acids with one or more polyols to give a polymer with excess hydroxyl functionality. The resulting alkyd could be further reacted with either t-butyl acetoacetate, or diketene to incorporate acetoacetyl-functionality onto the polymer, and with a suitable anhydride such as trimellitic anhydride to render the alkyd acid functional. The resulting acid functionality may then be neutralized with a neutralizing base to render the alkyd water dispersible.

Suitable oils and/or fatty acids derived therefrom include compounds such as, for example, linseed oil, safflower oil, tall oil, cotton seed, ground nut oil, tung oil, wood oil, ricinene oil or, preferably, sunflower oil, soya oil, castor oil, dehydrated castor oil, and the like. These oils or fatty acids can be used alone or as a mixture of one or more of the oils or fatty acids. Preferred fatty acids are soya fatty acids, dehydrated castor fatty acids, linolenic fatty acids, ricinoleic fatty acids, and linoleic fatty acids.

Suitable polyols useful in preparing a polyester or alkyd include compounds such as, for example, aliphatic, cycloaliphatic and/or araliphatic alcohols having 1 to 6, preferably 1 to 4, hydroxy groups attached to nonaromatic or aromatic carbon atoms. Examples of suitable polyols include, ethylene glycol, 1,2-propanediol, 1,3-propanediol, 1,2-butanediol, 1,3-butanediol, 1,4-butanediol, 2-ethyl-1,3-propanediol, 2-methylpropanediol, 2-butyl 2-ethylpropanediol, 2-ethyl-1,3-hexanediol, 1,3 neopentyl glycol, 2,2-dimethyl-1,3-pentanediol, 1,6 hexanediol, 1,2- and 1,4-cyclohexanediol, bisphenol A, 1,2- and 1,4-bis(hydroxymethyl)cyclohexane, bis(4-hydroxycyclohexyl)methane, adipic acid bis-(ethylene glycol ester), ether alcohols, such as diethylene glycol and triethylene glycol, dipropylene glycol, perhydrogenated bisphenols, 1,2,4-butanetriol, 1,2,6-hexanetriol, trimethylolethane, trimethylolpropane, trimethylolhexane, glycerol, pentaerythritol, dipentaerythritol, mannitol and sorbitol, and also chain-terminating monoalcohols having 1 to 8 carbon atoms such as propanol, butanol, cyclohexanol, benzyl alcohol, hydroxypivalic acid, and mixtures thereof.

The polybasic acids useful in preparing polyesters or alkyds include compounds such as, for example, aliphatic, cycloaliphatic saturated or unsaturated and/or aromatic polybasic carboxylic acids, such as, for example, dicarboxylic, tricarboxylic and tetracarboxylic acids. These compounds can be used alone or as a mixture of one or more polybasic acids. Suitable examples of polybasic acids include, for example, phthalic acid, isophthalic acid, adipic acid, terephthalic acid, tetrahydrophthalic acid, hexahydrophthalic acid, endomethylenetetrahydrophthalic acid, succinic acid, glutaric acid, sebacic acid, azelaic acid, trimellitic acid, pyromellitic acid, fumaric and maleic acid and the like, or mixtures thereof.

Polybasic acids, as used herein, are broadly defined to include anhydrides of the polybasic acids such as, for example, maleic anhydride, phthalic anhydride, succinic anhydride, tetrahydrophthalic anhydride, hexahydrophthalic anhydride, trimellitic anhydride, or mixtures thereof. These compounds can be used alone or as a mixture of one or more polybasic acids.

Suitable neutralizing bases to render the polyester or alkyd water dispersible include inorganic bases such as sodium hydroxide, potassium hydroxide, lithium hydroxide, ammonia, triethylamine, and dimethyl ethanol amine.

In addition to the water dispersible and latex UV curable polymers described above, the coating composition preferably includes an ethylenically unsaturated compound. Preferably, such compounds are multifunctional (i.e., include two or more ethylenically unsaturated groups), which makes them suitable crosslinkable diluents. Such compounds may be monomers, oligomers, polymers, or mixtures thereof. Preferred such ethylenically unsaturated compounds include (meth)acrylate functionality, vinyl functionality, vinyl ether functionality, (meth)allyl ether functionality (wherein (meth) allyl ether refers to an allyl ether and a methallyl ether), or mixtures thereof.

The coating composition can include one or more different ethylenically unsaturated compounds, preferably one or more (meth)acrylate monomers. Preferably, the (meth)acrylate monomers have two or more (meth)acrylate groups (i.e., they are multifunctional). In a presently preferred embodiment, the (meth)acryl functional groups of the (meth)acrylate monomers are bonded to core structural groups, which may be based on a wide variety of organic structures including tripropylene glycol, isobornyl alcohol, isodecyl alcohol, phenoxyethyl alcohol, trishydroxyethyl isocyanurate, trimethylolpropane ethoxylate, hexanediol, ethoxylated and propoxylated neopentyl glycol, oxyethylated phenol, polyethylene glycol, bisphenol ethoxylate, neopentyl glycol propoxylate, trimethylolpropane, propoxylated glycerol, di-trimethylolpropane, di and mono pentaerythritol, tetrahydrofurfuryl alcohol, beta-carboxyethyl alcohol, substituted derivatives of the above, combinations of the above, and the like.

Examples of suitable (meth)acrylate monomers include isobornyl (meth)acrylate, isodecyl (meth)acrylate, phenoxyethyl (meth)acrylate, trimethylolpropane tri(meth)acrylate, trimethylolpropane ethoxylate tri(meth)acrylate, tripropylene glycol di(meth)acrylate (TPGDA/TPGDMA), hexanediol di(meth)acrylate (HDDA/HDDMA), tetrahydrofurfuryl (meth)acrylate, beta-carboxyethyl (meth)acrylate, bisphenol A ethoxylate di(meth)acrylate, ethoxylated and propoxylated neopentyl glycol di(meth)acrylates, di-(trimethyolpropane tetra (meth)acrylate) (TMPTA/TMPTMA), pentaerythritol tri(meth)acrylate, pentaerythritol tetra(meth)acrylate, or mixtures thereof.

An allyl ether is another example of an ethylenically unsaturated compound that may be used in the coating composition. Preferably, the allyl ether functional groups of the allyl ether monomers are bonded to a core structural group which is based on a wide variety of polyhydric alcohols. Suitable polyhydric alcohols include neopentyl glycol, trimethylolpropane, ethylene glycol, propylene glycol, butylene glycol, diethylene glycol, trimethylene glycol, triethylene glycol, trimethylolethane, pentaerythritol, glycerol, diglycerol, 1,4-butanediol, 1,6-hexanediol, 1,4-cyclohexanedimethanol, and the like. Various mixtures of such alcohols can be used, if desired.

Examples of suitable allyl ether monomers include hydroxyethyl allyl ether, hydroxypropyl allyl ether, trimethylolpropane monoallyl ether, trimethylolpropane diallyl ether, trimethylolethane monoallyl ether, trimethylolethane diallyl ether, glycerol monoallyl ether, glycerol diallyl ether, pentaerythritol monoallyl ether, pentaerythritol diallyl ether, pentaerythritol triallyl ether, 1,2,6-hexanetriol monoallyl ether, 1,2,6-hexanetriol diallyl ether, and the like. Propoxylated and ethoxylated forms of these compounds are also suitable.

Another ethylenically unsaturated compound that can be used in the coating composition is a vinyl ether. Examples of suitable vinyl ether monomers include 4-hydroxybutyl vinyl ether, 1,4-cyclohexanedimethanol monovinyl ether, 1,4-cyclohexanedimethanol divinyl ether, ethylene glycol monovinyl ether, ethylene glycol divinyl ether, diethylene glycol monovinyl ether, diethylene glycol divinyl ether, triethylene glycol divinyl ether, and the like. Propoxylated and ethoxylated forms of these compounds are also suitable.

The ethylenically unsaturated compounds may be used in various combinations and may also provide a crosslinkable diluent function to the coating compositions.

Coating compositions of the present invention preferably include about 30 wt % to about 95 wt %, more preferably about 45 wt % to about 90 wt %, and even more preferably about 55 wt % to about 85 wt %, of the UV curable latex and/or water dispersible polymer, based on the combined weight of the ethylenically unsaturated compound and the latex/water dispersible polymer component of the composition. In one example embodiment, the coating composition includes about 55 wt % to about 85 wt % of an acetoacetyl-functional latex or water dispersible polymer, based on the combined weight of the ethylenically unsaturated compound and the acetoacetyl-functional polymer component of the composition.

The coating composition preferably includes about 5 wt % to about 70 wt %, more preferably about 7.5 wt % to about 50 wt %, and even more preferably about 10 wt % to about 40 wt %, of an ethylenically unsaturated compound, based on the combined weight of the ethylenically unsaturated compound and the latex/water dispersible polymer component of the composition.

The coating composition includes a free-radical initiator, particularly a photoinitiator, which induces a curing reaction when the composition is exposed to UV light. The photoinitiator is preferably present in an amount of about 0.1 wt % to about 10 wt %, based on the total weight of the coating composition.

Among photoinitiators suitable for use in the present invention with resins having (meth)acrylate or allyl ether functional groups are alpha-cleavage type photoinitiators and hydrogen abstraction-type photoinitiators. The photoinitiator may include other agents such as a coinitiator or photoinitiator synergist that aid the photochemical initiation reaction. Suitable cleavage type photoinitiators include alpha, alpha-diethoxyacetophenone (DEAP), dimethoxyphenylacetophenone (commercially available under the trade designation IRGACURE 651 from Ciba Corp., Ardsley, N.Y.), hydroxy-cyclo-hexylphenylketone (commercially available under the trade designation IRGACURE 184 from Ciba Corp.), 2-hydroxy-2-methyl-1-phenylpropan-1-one (commercially available under the trade designation DAROCUR 1173 from Ciba Corp.), a 25:75 blend of bis-(2,6-dimethoxybenzoyl)-2,4,4-trimethylpentyl phosphine oxide and 2-hydroxy-2-methyl-1-phenylpropan-1-one (commercially available under the trade designation IRGACURE 1700 from Ciba Corp.), a 50:50 blend of 2-hydroxy-2-methyl-1-phenylpropan-1-one and 2,4,6-trimethylbenzoyl-diphenylphosphine oxide (TPO, commercially available under the trade designation DAROCUR 4265 from Ciba Corp.), 2,4,6-trimethyl benzoylphosphine oxide (commercially available under the trade name IRGACURE 819, IRGACURE 819DW and Irgacure 2100 from Ciba Corp.), 2,4,6-trimethylbenzoyl-diphenylphosphine oxide (commercially available under the trade designation LUCIRIN from BASF Corp., Mount Olive, N.J.), and a mixture of 70% oligo 2-hydroxy-2-methyl-4-(1-methylvinyl) phenylpropan-1-one and 30% 2-hydroxy-2-methyl-1-phenylpropan-1-one) (commercially available under the trade designation KIP 100 from Sartomer, Exton, Pa.). Suitable hydrogen abstraction-type photoinitiators include benzophenone, substituted benzophenones (such as that commercially available under the trade designation ESCACURE TZT from Fratelli-Lamberti, sold by Sartomer, Exton, Pa.), and other diaryl ketones such as xanthones, thioxanthones, Michler's ketone, benzil, quinones, and substituted derivatives of all of the above. Preferred photoinitiators include DAROCUR 1173, KIP 100, benzophenone, and IRGACURE 184. A particularly preferred initiator mixture is commercially available under the trade designation IRGACURE 500 from Ciba Corp., which is a mixture of IRGACURE 184 and benzophenone, in a 1:1 ratio. This is a good example of a mixture of an alpha-cleavage type photoinitiator and a hydrogen abstraction-type photoinitiator. Other mixtures of photoinitiators may also be used in the coating compositions of the present invention. Camphorquinone is one example of a suitable photoinitiator for curing a coating composition with visible light.

A coating composition of the present invention can also include a coinitiator or photoinitiator synergist. The coinitiators can be tertiary aliphatic amines (such as methyl diethanol amine and triethanol amine), aromatic amines (such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate, (meth)acrylated amines (such as those commercially available under the trade designations EBECRYL 7100 and UVECRYL P104 and P115, all from UCB RadCure Specialties, Smyrna, Ga.), and amino-functional acrylate or methacrylate resin or oligomer blends (such as those commercially available under the trade designations EBECRYL 3600 or EBECRYL 3703, both from UCB RadCure Specialties). Combinations of the above categories of compounds may also be used.

Preferred photoinitiators include benzophenone, 4-methylbenzophenone, benzoyl benzoate, phenylacetophenones, 2,2-dimethoxy-2-phenylacetophenone, alpha,alpha-diethoxyacetophenone, hydroxycyclo-hexylphenylketone, 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one, 2,4,6-trimethylbenzoyl-diphenylphosphine oxide, and combinations thereof.

Preferred compositions include a free radical initiator that is a hydrogen abstraction-type photoinitiator. Preferably, the hydrogen abstraction-type photoinitiator is benzophenone or a 4-methylbenzophenone. Such compositions are at least partially curable by ultraviolet light.

The amount of hydrogen abstraction-type photoinitiator in such a composition is preferably at least 0.1 wt %, more preferably at least 0.2 wt %, and even more preferably at least 0.4 wt %, based upon the total weight of the composition. The amount of hydrogen abstraction-type photoinitiator in such a composition is preferably no more than 4 wt %, more preferably no more than 3 wt %, and even more preferably no more than 2 wt %, based upon the total weight of the composition.

Coating compositions having resins with vinyl ether functional groups can be cured by UV or visible light using cationic-generating photoinitiators. Examples of suitable cationic-generating photoinitiators include super acid-generating photoinitiators, such as triarylsulfonium salts. One useful triarylsulfonium salt is triphenyl sulfonium hexafluorophosphate.

Other methods for curing the coating compositions can be used alone or in combination with methods described above. Supplemental curing methods include heat cure, chemical cure, anaerobic cure, moisture cure, oxidative cure, and the like. Each method of cure requires a corresponding curing initiator or curing agent, which is included in the composition. For example, thermal cure can be induced by peroxides, metal drier packages can induce an oxidative cure, multifunctional amines (for example isophorone diamine) can cause a chemical crosslinking cure through Michael addition of amine groups onto acrylate reactive unsaturated groups. If these additional initiators are present in the coating composition they are preferably present in an amount of at least 0.1 wt %, based on the weight of the coating composition. Preferably, they are present in an amount of no greater than 12 wt %, based on the weight of the coating composition.

The coating compositions further include mar/scratch resistant additives such as, for example, macrocrystalline or single crystal mineral abrasives including metal oxides such as, for example, aluminum oxide; inorganic non-metal oxides such as silica oxides, calcium oxides, boron oxides, and the like; ground glass particles and beads; and ceramic particles and beads.

The mar/scratch resistant additives used in the coating composition preferably have a particle size ranging from about 1 micron to about 500 microns, more preferably about 1 micron to about 25 microns. The additives can be of a homogeneous particle size or several particle sizes in combination. The mar/scratch resistant additives are also specified by hardness as measured according to the Mohs' scale of hardness, and the mineral abrasives used should exhibit high Mohs' hardness of about 6 or greater.

In one embodiment, the mar/scratch resistant additive forms about 5 wt % to about 80 wt % by weight of the coating composition. Sealer coats/primer coats have higher weight percentages of the mineral abrasive composition than mineral abrasive-filled top coat compositions. Top coat compositions are usually formulated to contain about 5 wt % to about 20 wt % of the mar/scratch resistant additive, while sealer/primer coat compositions are formulated to contain about 5 wt % to about 80 wt % of the additive. The level of gloss of the coating composition decreases as the percent by weight of the mar/scratch resistant additive in the coating is decreased, and the level of gloss also decreases as the particle size of the additive is increased.

In the present application, the term scratch-resistant refers to coating compositions that, when fully hardened on a substrate, are not marred by 10 light pressure double rubs with a steel wool or an abrasive pad. For example, the scratch resistance of a dried coating can be evaluated with coarse #40 steel wool pads, or kitchen scrubbing pads available from 3M, St. Paul, Minn., under the trade designation SCOTCHBRITE.

The coating compositions further include a thixotropic and/or pseudoplastic anti-settling agent, which in this application refers to compounds that interact with the film forming UV curable resins in the coating composition to form a thixotropic and/or pseudoplastic structure. The term pseudoplastic (sometimes confused with thixotropic) structure refers to colloidal gel-like materials that shear thin (liquefy and flow freely) when mechanically agitated, but return to a gel form (a disperse phase combined with a continuous phase to produce a viscous jelly-like product) when at rest. The thixotropic and/or pseudoplastic anti-settling agent acts as a stabilizer and/or dispersing aid to enhance and/or maintain suspension of particles in the coating composition such as the mar/scratch resistant additives, pigment particles and the like. The thixotropic and/or pseudoplastic anti-settling agents may be used alone, or may be combined with other rheology control agents (for example, waxes, thickeners and the like) to provide enhanced dispersibility in a selected coating composition.

In one embodiment, the thixotropic and/or pseudoplastic anti-settling agent may be a microcrystalline cellulose compound (MCC). The MCC may be used alone, or may be further processed with a soluble hydrocolloid such as, for example, carboxylated methylcellulose (CMC), to provide a colloidal MCC that is easily dispersed in water. Preferred colloidal MCC compounds include, but are not limited to, those available from FMC Corp, Newark, Del., under the trade designation NTC, particularly NTC-61, which is a combination of MCC and sodium CMC.

Properly dispersed colloidal MCC sets up into a water-insoluble three dimensional matrix or network that imparts stability to the coating composition. While not wishing to be bound by any theory, currently available evidence indicates that the network is held together with hydrogen bonding between the particles of MCC and CMC. This three dimensional network effectively prevents solid particles in the composition from settling or agglomerating to form a cake in their container, which ensures that the solid particles in the coating composition can be easily stirred and re-dispersed to a homogeneous state prior to application of the coating composition. In some embodiments, the colloidal MCC also appears to physically prevent agglomeration of the latex particles in the coating composition and prevent them from coalescing.

In another embodiment, the thixotropic and/or pseudoplastic anti-settling agent is an amine salt of a microcrystalline synthetic wax, such as, for example, microcrystalline polyethylene wax, polybutylene wax, polyethylene-acrylic wax, polyester wax, polyamide wax, Fischer-Tropsch wax, mixtures thereof and the like. The microcrystalline wax, which is preferably a microcrystalline polyamide wax, preferably has a particle size diameter of from about 10 to about 500 nanometers with a size distribution of from about 1.2 to about 1.6. Suitable amine salts of synthetic polyamide waxes include, but are not limited to, those available under the trade designation AQ 600 from Kusamoto Chemicals, Ltd., of Tokyo, Japan, particularly AQ 610. The amine salts of synthetic waxes interact with the UV curable film-forming resins in the coating composition to form a thixotropic structure, which prevents settling of the pigment particles and anti-scratch particles.

In yet another embodiment, the thixotropic and/or pseudoplastic anti-settling agent is a urea urethane such as, for example, those available from Byk under the trade designation Byk 425, or a urethane enzymatically modified starch such as, for example, those available from Rohm & Haas under the trade designation Acrysol RM-12W.

The thixotropic and/or pseudoplastic anti-settling agents can be present in the coating composition, for example, at about 0.5% by weight to about 5.0% by weight, more preferably about 0.5% by weight to about 1.5% by weight, based on the total weight of the composition.

As noted above, the thixotropic and/or pseudoplastic anti-settling agents form a gel-like material, which readily breaks down with shear provided by, for example, mechanical agitation. The resulting shear-thinned composition is easily atomized to pass through a spray nozzle, and produces little or no foam to interfere with flow or leveling of the applied coating. For spray applications, the viscosity of the coating compositions can range from about 20 centipoise (0.2 Pa·s) up to about 800 centipoise (8 Pa·s), depending on the degree of loading of the mineral abrasive and the polymeric components of the composition. Viscosity can be measured with Zahn cups, ford cups, and the like, as well as using a Brookfield viscometer, stormer and the like under near static to dynamic conditions. For example, viscosity measurements can be taken with the coating composition under mild agitation with a #3 Zahn signature cup.

The thixotropic and/or pseudoplastic anti-settling agents can prevent the composition from hard settling, in which the components of the coating composition form a hard cake on the bottom of the storage container. In some embodiments, the coating composition is storage stable, which in this application means that the composition does not form a hard cake when stored at room temperature for at least one month, preferably at least three months, and even more preferably at least six months.

In addition, in some embodiments the thixotropic and/or pseudoplastic anti-settling agents can also keep scratch-resistant additives closer to the surface of the coating composition as the coating composition is dried, which provides enhanced performance in scratch resistance tests.

The coating compositions can be applied using techniques including spray coating, brush coating, curtain coating, direct or differential roll coating applications, or the surface to be coated can be impregnated with the coating composition by immersion in a bath containing the coating composition. Spray application can be conventional air, air assist airless, airless, HVLP and the like, and also electrostatic disk, bells, and the like.

The coating composition can be applied to a surface such as a wood surface, a vinyl surface, a tile surface, a rubber modified cement surface, a marble surface, a metal surface, a plastic surface, or the surface of a laminated wall covering, flooring, or piece of furniture, and the like.

The coating compositions may include a surface-active agent that modifies the interaction of the curable coating composition with the substrate. In particular, the agent can modify the ability of the composition to wet a substrate. Surface active agents may have other properties as well. For example, surface active agents may also include leveling, defoaming, or flow agents, and the like. The surface active agent affects qualities of the curable coating composition including how the coating composition is handled, how it spreads across the surface of the substrate, and how it bonds to the substrate. If it is used, the surface active agent is preferably present in an amount of no greater than 5 wt %, based on the total weight of the coating composition.

Surface active agents have also been found to assist incorporation as well as assist coating formulation. Surface active agents suitable for use in coating compositions are known to those of skill in the art or can be determined using standard methods. Exemplary surface active agents include polydimethylsiloxane surface active agents (such as those commercially available under the trade designations SILWET L-760 and SILWET L-7622 from OSI Specialties, South Charleston, W. Va., or BYK 306, BYK 333, and BYK 346 from Byk-Chemie, Wallingford, Conn.) and fluorinated surface active agents (such as those commercially available under the trade designation FLUORAD FC-430 from 3M Co., St. Paul, Minn.). Suitable wetting and/or surface active agents can also include those available under the trade designation Dynol 607 and Dynol 604 from Air Products and Chemicals, as well as those available from Evonik-Degussa Industries under the trade designation Tego Wet series.

The surface active agents may further include a defoamer. Suitable defoamers include polysiloxane defoamers (such as a methylalkylpolysiloxane like that commercially available under the trade designation BYK 077 or BYK 500 from Byk-Chemie) or polymeric defoamers (such as those commercially available under the trade designation BYK 051 from Byk-Chemie), ether-modified polysiloxane-based defoamer available under the trade designation Surfynol DF-62 from Air Products and Chemicals, those available from Evonik-Degussa Industries under the trade designation, Tego Airex-904W, and the like.

The coating composition can be opaque, colored, pigmented, or transparent (no pigment). Suitable pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, and/or organic yellows (such as Hansa yellow). Also included are IR reflective pigments Shepherd yellows, Shepherd blacks, Shepherd blues, and Shepherd greens (Shepherd Color Co., Cincinnati, Ohio). Also included are metallic and effect pigments-Stapa (Eckart Corp., Louisville, Ky.) Affliar, Iriodan, (Merck, EMD Chemicals, Gibbstown, N.J.).

The composition can also optionally include a gloss control additive or an optical brightener, such as, for example, those commercially available under the trade designation UVITEX OB from Ciba-Geigy.

In certain embodiments it is advantageous to include fillers or inert ingredients in the coating composition. Fillers and inert ingredients include, for example, clay, glass beads, calcium carbonate, talc, silicas, organic fillers, and the like. Fillers extend, lower the cost of, alter the appearance of, or provide desirable characteristics to the composition before and after curing. Suitable fillers are known to those of skill in the art or can be determined using standard methods. Fillers or inert ingredients are preferably present in an amount of about 0.1 wt % to about 40 wt %, based on the total weight of the coating composition.

The coating composition may also include other ingredients that modify properties of the curable coating composition as it is stored, handled, or applied, and at other or subsequent stages. Waxes, flatting agents, and other similar performance enhancing additives may be employed in this invention as required in amounts effective to upgrade the performance of the cured coating and the coating composition. Desirable performance characteristics of the coating include chemical resistance, abrasion resistance, hardness, gloss, reflectivity, appearance, or combinations of these characteristics, and other similar characteristics.

Certain coating compositions may also include one or more of a group of ingredients that can be called performance enhancing additives. Typical performance enhancing additives that may be employed include thickeners, heat stabilizers, leveling agents, anti-cratering agents, curing indicators, plasticizers, sedimentation inhibitors, ultraviolet-light absorbers, and the like to modify properties. Other components of the coating compositions include those typically used in paint formulations, such as biocides, mildewcides, surfactants, dispersants, defoamers, and the like. Suitable additives for use in coating compositions of the present invention are described in Koleske et al., *Paint and Coatings Industry*, April, 2003, pages 12-86.

The coating compositions may be applied to a variety of substrates including wood, cement, cement fiber board, wood-plastic composites, tile, metal, plastic, glass, optical fibers, and fiberglass. Coating compositions can be applied to a substrate by a variety of methods known to those skilled in the art. Such methods include spraying, painting, rollcoating, brushing, fan coating, curtain coating, spreading, air knife coating, die-coating, vacuum coating, spin coating, electrodeposition, and dipping.

The thickness of the coatings will vary with the application. Typically, the coatings will have a thickness of 0.1 mil to 20 mils (0.00025 centimeter (cm) to 0.0508 cm), however, thicker or thinner coatings are also contemplated depending on, for example, the desired coating properties.

The present disclosure also provides methods for coating that involve applying a coating composition to a substrate and allowing the coating composition to harden (e.g., by exposing the coating composition to radiation such as ultraviolet or visible light). The present disclosure also provides coatings prepared or preparable from the coating compositions described herein.

Preferred coatings are cured by exposing the coating to radiation having a wavelength in the range of $10^{-3}$ nm to 800 nm. More preferably, the coating compositions are exposed to ultraviolet or visible light in the range of 200 nm to 800 nm. Preferred coatings, which are designed to be cured by ultraviolet or visible light, are preferably exposed to 100 Mjoules/$cm^2$ to 5000 Mjoules/$cm^2$, more preferably exposed to 300 Mjoules/$cm^2$ to 2000 Mjoules/$cm^2$, and even more preferably exposed to 500 Mjoules/$cm^2$ to 1750 Mjoules/$cm^2$.

EXAMPLES

Reagents

ACRYSOL RM-12W, rheology modifier, Rohm and Haas, Philadelphia, Pa.
ACRYSOL RM-2020—urethane rheology modifier, Rohm and Haas, Philadelphia, Pa.
ACEMATT TS 100—thermally processed silica matting agent, Evonik-Degussa, Parsippany, N.J.
AQUASPERSE YELLOW OXIDE 877-1812—pigment
AQUASPERSE RED OXIDE 87701035—pigment
AQUACHEM BURNT UMBER 896-1301—pigment
AQUACHEM JET BLACK 896-9940—pigment
BYK-025—surfactant, Byk Chemie, Wallingford, Conn.
BYK-346—surfactant, Byk Chemie
BYK-425—pseudoplastic reology additive, Byk-Chemie
CERAFLOUR 928—wax, Byk-Chemie
CLAY—inert pigment (fine)—any approved source
DEHYDRAN 1293—defoamer, Cognis Corp., Monheim, Germany
DISPARLON AQ 610—thixotropic anti-sag agent (amine salt of a polyamide wax), Kusumoto Chemicals, Tokyo, Japan
DISPERBYK 190 and 2010, surfactant and dispersing aid, Byk-Chemie
DYNOL 607—surfactant, Air Products and Chemicals, Inc., Allentown, Pa.
HIGH TEMPERATURE BLACK 896-9910—pigmented acrylic resin, Evonik-Degussa
IRGACURE 819DW—photoinitiator, Ciba Corp., Ardsley, N.Y.
IRGACURE 500—photoinitiator, Ciba Corp.
IRGACURE 2100, photoinitiator, Ciba Corp.
LUX 430, 480, 481, 515 (WB UV PUD)—acrylic/polyurethane copolymer dispersion, Alberdingk Boley, Greensboro, N.C.
MICHEM EMULSION 32535—wax, Michelman, Inc., Cincinnati, Ohio
MINEX 10—natural mined Si, E W Kaufmann, Bristol, Pa.
NTC-61—microcrystalline cellulose dispersed in water (anti-sag agent), FMC Corp., Philadelphia, Pa.
OMNIRAD TPO-L, photoinitiator, IGM Resins, Waalwijk, Netherlands
OMNIRAD CURE-ALL 2000, photoinitiator, IGM Resins
SARTOMER 355 (DiTMPTA)—tetra functional acrylate monomer Sartomer Corp., Exton, Pa.
SARTOMER 9020 (GPTA)—triacrylate monomer, Sartomer Corp.
SHEPHERD YELLOW 29 896-2812, pigment
SPW 1000 ($Al_2O_3$)—aluminum oxide pigment
SURFACTOL 365, surfactant and dispersing aid, Vertellus, Greensboro N.C.
SURFYNOL 104-A—flow and defoaming agent, Air Products and Chemicals, Inc., Allentown, Pa.
SURFYNOL DF-62, flow/defoaming agent, Air Products and Chemicals, Inc.
SYLOID 1005, 1007, 7000—silica flatting agent, W.R. Grace Co., Columbia, Md.
TALC—inert pigment (fine)—any approved source
TEGO AIREX 904W, air release agent, Evonik, Hopewell Va.
TINT-EZE NATPHOL RED BS, paint tinting concentrate, Benjamin Moore & Co.
TI-PURE R-900 pigment
UCECOAT 7674, 7655—UV curable polyurethane dispersion, Cytec Indus., Inc., Woodland Park, N.J.
WJ 0404P—UV curable polyurethane dispersion, Valspar Corp. Minneapolis, Minn.
WQ0804P WB EMULSION—UV curable styrene/acrylic emulsion, Valspar Corp., Minneapolis, Minn.
ZEEOSPHERES W210—sodium glass scratch agent, 3M Co., St. Paul, Minn.

Example 1

Scratch Resistant White/Off-White UV Curable Coating

The pigments, metal particles and flatting agents listed in Table 1 below were dispersed in a mixer/disperser such as those available from Morehouse Cowles, Chino, Calif., or Hockmeyer Equipment Corp., Elizabeth City, N.C. Then, the remainder of the ingredients were added and dispersed in the mixer to create a coating composition.

TABLE 1

| REAGENT | Lbs/100 gallons |
|---|---|
| STYRENE ACRYLIC EMULSION | 219.7 |
| WB UV PUD | 124.5 |
| TRIFUNCTIONAL ACRYLIC MONOMER | 75.0 |
| SURFYNOL 104-A | 7.4 |
| ANTI-SAG/ANTI-SETTLING AGENT | 74.4 |
| ACRYSOL RM-2020 THICKENER | 19.3 |
| DISPERBYK 190 | 18.6 |
| BYK-025 | 2.0 |
| SPW 1000 ($Al_2O_3$) | 30.0 |
| SYLOID 7000 | 6.8 |
| MICHEM EMULSION 32535 | 41.5 |
| CERAFLOUR 928 | 9.0 |
| DEHYDRAN 1293 | 2.0 |
| IRGACURE 819DW | 10.6 |
| IRGACURE 500 | 11.7 |
| DYNOL 607 | 3.7 |
| PIGMENT | 83.5 |
| SOLVENT | 20.7 |
| WATER | 186.5 |
| TOTAL | 947.0 |

The resulting coating composition weighed 9.47 lbs/gal, and had a NVV of 33.55%, a NVM of 41.95%, a PVC of 11.23%, and a VOC content of 3.30%.

The coating composition was sprayed at 100-120 grams/square meter on wood, force dried at 40-50° C. for 6-12 min, and UV cured @ 500-1000 mj/cm$^2$ and 200-800 mw/cm$^2$ UVA and UVV.

After curing was complete, the coating had a gloss of 20-50 @ 60 degree angle. The coating had scratch resistance to abrasion by 10 light pressure double rubs with #40 coarse steel wool. The coating also had scratch resistance to abrasion by 10 light pressure double rubs with coarse cleaning pads available from 3M, St. Paul, Minn., under the trade designation SCOTCHBRITE.

Example 2

Scratch Resistant UV Curable White Coating

Using the procedure set forth in Example 1 above, a coating composition was prepared with the ingredients in Table 2 below.

TABLE 2

| | Lbs/100 gallons |
|---|---|
| SOLVENT | 20.9 |
| PROPYLENE GLYCOL | 8.0 |
| SURFYNOL 104-A | 8.1 |
| TRIFUNCTIONAL ACRYLIC MONOMER | 75.5 |
| WATER | 160.3 |
| ANT-SAG/ANTI-SETTLING AGENT | 59.2 |
| ACRYSOL RM-2020 | 20.5 |
| DISPERBYK 190 | 30.5 |
| BYK-025 | 2.0 |
| ACEMATT TS 100 SILICA | 6.1 |
| ZEEOSPHERES W210 (GLASS) | 25.4 |
| TI-PURE R-900 | 142.2 |
| STYRENE ACRYLIC EMULSION | 221.1 |
| WB UV PUD | 125.3 |
| MICHEM EMULSION 32535 | 41.8 |
| DEHYDRAN 1293 | 2.0 |
| AQUAFLOUR 400 | 4.1 |
| IRGACURE 500 | 10.2 |
| IRGACURE 819 DW | 12.2 |
| BYK-346 | 4.0 |
| DYNOL 607 | 4.1 |
| BLACK TINTER | 0.8 |
| RED TINTER | 0.1 |
| TOTAL | 985.0 |

The resulting coating composition weighed 9.84 LBS/GAL, had an NVV of 36.12%, an NVM of 46.31%, a PVC of 16.45%, and a VOC content of 4.25%.

The coating composition was sprayed at 100-120 grams/square meter on wood, force dried at 40-50° C. for 6-12 min, and UV cured @500-1000 mj/cm$^2$ and 200-800 mw/cm$^2$ UVA and UVV.

After curing was complete, the coating had a gloss of 20-50 @60 degree angle. The coating had scratch resistance to abrasion by 10 light pressure double rubs with #40 coarse steel wool and SCOTCHBRITE cleaning pads.

Example 3

Scratch Resistant UV Curable Oyster Coating

Using the procedure set forth in Example 1 above, a coating composition was prepared with the ingredients in Table 3 below.

TABLE 3

| | Lbs/100 gallons |
|---|---|
| SOLVENT | 21.0 |
| PROPYLENE GLYCOL | 8.0 |
| SURFYNOL 104-A | 8.2 |
| BYK-025 | 2.0 |
| TRIFUNCTIONAL ACRYLIC MONOMER | 60.7 |
| ANTI-SAG/ANTI-SETTLING SOLUTION | 20.2 |
| ACRYSOL RM-2020 | 14.8 |
| DISPERBYK-190 | 30.7 |
| WATER | 123.4 |
| SYLOID 7000 | 13.1 |
| MINEX 10 (NATURAL) | 30.2 |
| TI-PURE R-900 | 110.9 |
| WB UV PUD | 216.8 |
| STYRENE ACRYLIC EMULSION | 194.6 |
| MICHEM EMULSION 32535 | 42.0 |
| DEHYDRAN 1293 | 2.0 |
| AQUAFLOUR 400 | 8.1 |
| IRGACURE 500 | 10.2 |
| IRGACURE 819DW | 4.0 |
| OMNIRAD TPO-L | 6.0 |

TABLE 3-continued

| | Lbs/100 gallons |
|---|---|
| BLACK TINTER | 0.5 |
| RED TINTER | 0.1 |
| YELLOW TINTER | 7.1 |
| TOTAL | 973.0 |

The resulting coating composition weighed 9.73 LBS/GAL, had an NVV of 36.3%, an NVM of 45.8%, a PVC of 15.27%, and a VOC content of 4.90%.

The coating composition was sprayed at 100-120 grams/square meter on wood, force dried at 40-50° C. for 6-12 min, and UV cured @ 500-1000 mj/cm$^2$ and 200-800 mw/cm$^2$ UVA and UVV.

After curing was complete, the coating had a gloss of 20-50 @ 60 degree angle. The coating had scratch resistance to abrasion by 10 light pressure double rubs with #40 coarse steel wool and SCOTCHBRITE cleaning pads.

Example 4

Mar Resistant UV Curable Oyster Coating

Using the procedure set forth in Example 1 above, a coating composition was prepared with the ingredients in Table 4 below.

Deep cure/surface cure photoiniator mixture at 1-3 wt % can be post-added at the application site to extend the shelf-life of the coating to 6+ months prior to addition.

TABLE 4

| | Lbs/100 gallons |
|---|---|
| SOLVENT | 25.9 |
| PROPYLENE GLYCOL | 3.7 |
| SURFYNOL 104-A | 6.4 |
| TETRAFUNCTIONAL ACRYLIC MONOMER | 40.0 |
| TRIFUNCTIONAL ACRYLIC MONOMER | 26.7 |
| WATER | 95.7 |
| SURFACTANT | 12.1 |
| DEFOAMER | 0.5 |
| SURFACTANT | 22.9 |
| ANTI-SAG/ANTI-SETTLING SOLUTION | 92.8 |
| FLATTING PIGMENT | 11.8 |
| TI-PURE R-900 | 110. |
| WB UV PUD | 118.7 |
| WATER | 68.7 |
| STYRENE ACRYLIC EMULSION | 194.6 |
| MICHEM EMULSION 32535 | 34.8 |
| DEFOAMER | 0.5 |
| BYK 346 | 3.2 |
| DYNOL 607 | 3.2 |
| TINT | 2.6 |
| WATER | 69.9 |
| TOTAL | 944.4 |

The resulting coating composition weighed 9.44 LBS/GAL, had an NVV of 29.5%, an NVM of 38.2%, a PVC of 13.6%, and a VOC content of 3.8%.

The coating was mar resistant but did not include the anti-scratch (steel wool scratch) additive, and such additives could be incorporated into the coating as necessary for a particular application. The coating also had good resistance to common household staining agents such as water, coffee and mustard.

Example 5

Coating System

The coatings described above can be used in multiple coats as self-sealed or it can be applied as a topcoat over a water-borne, UV-curable (WB UV) primer, or over a mixture containing the WB UV-curable inert primer and the topcoat. This system allows the color shade of the primer to be made similar to that of the topcoat, while providing a more economical high quality system.

In some embodiments, the applied system can include 1-2 coats of the inert primer and 1 coat of an opaque topcoat such as those described in Examples 1-4 above. The inert primer has good shelf life (no deep cure photoiniator). The opaque topcoat requires a deep cure/surface cure photoiniator mixture, which can be post added at the application site, thus extending the shelf life for the top coat. In addition, photoiniated topcoat from over-spray reclaim can be used in making the primer mixture.

An example of WB UV Inert Primer suitable for use in this system is shown in Table 5 below:

TABLE 5

|  | Lbs/100 gallons |
| --- | --- |
| SOLVENT | 28.3 |
| PROPYLENE GLYCOL | 7.6 |
| SURFYNOL 104A | 7.1 |
| TRIFUNCTIONAL ACRYLIC MONOMER | 76.8 |
| WATER | 160.9 |
| SURFACTANT | 12.5 |
| DISPERSING AGENT | 57.4 |
| CLAY INERT PIGMENT (FINE) | 79.0 |
| TALC INERT PIGMENT (FINE) | 52.6 |
| FLATTING PIGMENT | 21.0 |
| WB UV PUD | 153.5 |
| STYRENE ACRYLIC EMULSION | 262.4 |
| IRGACURE 500 | 10.2 |
| DYNOL 607 | 3.1 |
| BYK 346 | 3.1 |
| DEFOAMER | 0.5 |
| ANTI-SAG/ANTI-SETTLING AGENT | 20.2 |
| TOTAL | 956.2 |

The resulting coating composition had an NVV of 40.4%, an NVM of 48.5%, a PVC of 17.8%, and a VOC content of 4.3%.

Various embodiments of the invention have been described. These and other embodiments are within the scope of the following claims.

The invention claimed is:

1. A method, comprising:
  applying to a substrate a coating composition, comprising:
    an ultraviolet (UV) curable film forming resin, wherein the film forming resin comprises a water dispersible or a latex polymer selected from polyurethane polymers, acrylic polymers and combinations thereof; and
    a multifunctional (meth)acrylate monomer;
    wherein the water dispersible or latex polymer is present in the coating composition at about 30 wt % to about 95 wt %, based on the combined weight of the water-dispersible or latex polymer and the multifunctional (meth)acrylate monomer, and the multifunctional (meth)acrylate monomer is present in the coating composition at about 5 wt % to about 70 wt %, based on the combined weight of the water-dispersible or latex polymer and the multifunctional (meth)acrylate monomer; and
    about 0.5% by weight to about 5.0% by weight, based on the total weight of the composition, of a colloidal microcrystalline cellulose compound (MCC);
    about 5 wt % to about 80 wt %, based on the total weight of the composition, of at least one of a mineral abrasive, inorganic non-metal oxide, glass particles and beads, and ceramic particles and beads;
    about 0.1 wt % to about 10 wt %, based on the total weight of the composition, of a photoinitiator; and
    water;
  and
  exposing the coating composition to ultraviolet (UV) light.

2. The method of claim 1, wherein the acrylic polymer comprises vinyl functionality.

3. The method of claim 2, wherein the acrylic polymer comprises a copolymer of an acrylic monomer and a styrene monomer.

4. The method of claim 1, wherein the mineral abrasive is $Al_2O_3$.

5. The method of claim 1, wherein the multifunctional (meth)acrylate monomer is selected from the group consisting of trimethylolpropane tri(meth)acrylate, trimethylolpropane ethoxylate tri(meth)acrylate, tripropylene glycol di(meth)acrylate, hexanediol di(meth)acrylate, bisphenol A ethoxylate di(meth)acrylate, ethoxylated neopentyl glycol di(meth)acrylate, propoxylated neopentyl glycol di(meth)acrylate, di-(trimethyolpropane tetra (meth)acrylate), pentaerythritol tri(meth)acrylate, pentaerythritol tetra(meth)acrylate, and mixtures thereof.

6. A coating prepared by the method of claim 1.

7. The method of claim 1, wherein the inorganic metal oxide is selected from silica oxides, calcium oxides, and boron oxides.

8. The method of claim 1, wherein the coating composition is applied to the substrate by spraying.

9. The method of claim 1, wherein the coating composition further comprises a pigment.

10. A method, comprising:
  applying to a substrate a coating composition, comprising:
    an ultraviolet (UV) curable film forming resin, wherein the film forming resin comprises a water dispersible or a latex polymer selected from polyurethane polymers, acrylic polymers comprising a copolymer of an acrylic monomer and a styrene monomer, and combinations thereof; and
    a multifunctional (meth)acrylate monomer; and
    wherein the water dispersible or latex polymer is present in the coating composition at about 55 wt % to about 85 wt %, based on the combined weight of the water-dispersible or latex polymer and the multifunctional (meth)acrylate monomer, and the multifunctional (meth)acrylate monomer is present in the coating composition at about 10 wt % to about 40 wt %, based on the combined weight of the water-dispersible or latex polymer and the multifunctional (meth)acrylate monomer; and
    about 0.5% by weight to about 5.0%, based on the total weight of the composition, of a colloidal microcrystalline cellulose compound (MCC);
    about 5 wt % to about 80 wt %, based on the total weight of the composition, of at least one of a mineral abrasive, inorganic non-metal oxide glass particles and beads, and ceramic particles and beads;
    about 0.1 wt % to about 10 wt %, based on the total weight of the composition, of a photoinitiator; and
    water;
  and
  exposing the coating composition to ultraviolet (UV) light.

11. The method of claim 10, wherein the coating composition comprises about 5 wt % to about 20 wt %, based on the total weight of the composition, of at least one of a mineral abrasive, inorganic non-metal oxide glass particles and beads, and ceramic particles and beads.

12. The method of claim 10, wherein the coating composition is applied to the substrate by spraying.

13. The method of claim 10, wherein the coating composition further comprises a pigment.

* * * * *